June 6, 1950     T. I. LINDHAGEN ET AL     2,510,506
TURBO-JET POWER PLANT WITH CONTROLLABLE PRIMARY
AND SECONDARY OUTLETS
Filed July 14, 1945

Patented June 6, 1950

2,510,506

UNITED STATES PATENT OFFICE 2,510,506

TURBOJET POWER PLANT WITH CONTROLLABLE PRIMARY AND SECONDARY OUTLETS

Teodor Immanuel Lindhagen, Stockholm, and Gustav Karl William Boestad, Lidingo, Sweden, assignors, by mesne assignments, to Jarvis C. Marble, New York, N. Y., Leslie M. Merrill, Westfield, N. J., and Percy H. Batten, Racine, Wis., as trustees Application July 14, 1945, Serial No. 605,008
In Sweden July 15, 1944

1 Claim. (Cl. 60—35.6)

This invention relates to airplanes propelled entirely or in part by reactive or jet propulsion.

Airplanes built for high speed flight have a small lifting surface, so that the landing speed becomes so great as to require long landing strips, if the plane is not braked before landing or on its way over the landing strip. Various means, such as flaps and air brakes, have been used to effect the braking in question. Furthermore, it has been suggested to equip airplanes with a controllable outlet for gases escaping from the driving machinery thereof, said outlet being directed forwardly in the direction of movement of the plane while being arranged to have the gases flowing therethrough, when the speed of the plane is to be reduced. The object of this invention is to provide an arrangement of this kind which is capable, inter alia, of effectively reducing the speed of the plane before the landing or during the same, and which in spite of this does not have an interfering effect on the propulsion. This is obtained substantially by the fact that the outlet is constituted by flaps adapted to be withdrawn into the fuselage.

According to the invention, a considerable reduction of the speed is obtained before landing. The braking of the plane takes place still more rapidly, after the plane has touched ground, by reason of the fact that the braking force from the gas stream increases with a reduced speed of the plane. If an airplane is driven at a speed of 250 metres per second with a reaction motor so dimensioned that 10 kilograms of air are blown out per second at a relative velocity with respect to that of the airplane of 750 metres per second, a tractive force is obtained equal to $$\frac{10}{g}(750-250) = 500 \text{ kilograms}$$

corresponding to an output of $$\frac{500 \times 250}{75} = \text{about } 1,700 \text{ H. P.}$$

Here, $g$ designates the acceleration of gravity. If in landing the plane has a speed of 100 metres per second and the gas is instead blown forwardly at the same relative velocity, that is to say at 750 metres per second, a braking power of the magnitude of $$\frac{10 \text{ kg.}}{g} \times (750 \div 100) = 850 \text{ kg.}$$

will be obtained, which power is thus considerably greater than the power propelling the plane. By thus turning the gas stream from the reaction machine forwardly or at an angle to the flying direction of the plane, it will be possible, particularly when such a motor operates at full power, to create a very great braking power, without the propelling properties of the airplane in normal operation being impaired thereby.

The invention will be described more in detail in the following with reference to an embodiment disclosed by way of example in the accompanying diagrammatic drawing, other features characteristic of the invention being then also pointed out.

Fig. 1 shows a portion of an airplane provided with a braking device constructed in accordance with the invention, this figure being a longitudinal section; and Figs. 2 and 3 are sections on lines II—II and III—III, respectively, in Fig. 1.

In the drawing, 10 designates the rear portion of the fuselage of an airplane and a body inserted therein. At the rear, the fuselage 10 has an outlet opening 12 for the exhaust gases from the driving machinery of the airplane, such machinery being formed, entirely or in part, for reactive operation. A portion of this driving machinery, that is to say a gas turbine 14, is shown in Fig. 1. The gaseous driving medium still has a certain pressure above atmospheric on having passed through the turbine, when said driving medium enters the chamber 16 at the rear end of the fuselage. Inasmuch as the driving machinery may be formed in any suitable manner known per se and has no bearing on the present invention, it will not be described in detail herein.

Inserted into the outlet portion of the chamber 16 is a streamline-shaped valve body 18, which in the normal forward flight of the plane takes a position corresponding to that indicated by chain-dotted lines in Fig. 1, the exhaust gases flowing at a high velocity through the reaction nozzle 20 formed between the shell 10 and the valve body. The valve body 18 is displaceable to control the area of the outlet 20, which is entirely closed when the valve body takes the position shown by full lines in Fig. 1. The valve body 18 has an internal cylindrical portion 22 sliding on and guided by a cylinder 24 rigidly arranged at the center of the fuselage. A piston 28 is slidable within a chamber 26 in said cylinder, and is connected to a rod 30 extending through the rear end wall of the chamber and rigidly connected with the valve body 18. A pressure fluid, such as oil, is introduced into the chamber 26 on one side of the piston 28 through a conduit 32, and is supplied to the other side of said piston through a pipe 34, which opens into the chamber 26 through radial holes 36 in the rod 30. The pipe 34 is slidably fitted into a pipe 40 secured in the cylinder 24 or in the partition 38 thereof.

The cylinder 24 is connected by means of a funnel-shaped sleeve 42 to the frame of the turbine 14. The parts 24, 42 are surrounded by a sleeve 44 likewise connected to the turbine frame, said sleeve 44 being retained in position by radially disposed pipes 46 and abutting against the cylinder 24 with the aid of a flange 48, so that this cylinder will be safely braced. Cooling air is taken in through the pipes 46, said air flowing both ways in the intermediate space between the parts 24, 42 and 44. Provided on one side of the sleeve 44 are outlets 50 for cooling air flowing forwardly from the pipes 46. This air is carried off to the chamber 16. Another portion of the cooling air flows through openings 52 to the intermediate space between the sleeve 44 and the piston chamber 26, and continues through the valve body 18 and through openings 54 into the atmosphere.

Provided in the fuselage 10 in front of the outlet 12 are openings having flaps 56 arranged therein. Thus four of such flaps may be distributed about the circumference of the fuselage. The flaps 56 are pivotally mounted in the fuselags 10, as at 58, at the rear edge of the openings, and are U-shaped in section, at right angles to the longitudinal direction of the airplane. When taking their open position, as shown in the figures, they form outlet openings against or at an angle to the flying direction of the airplane, and their lateral walls 60 prevent the gases flowing out through the same from expanding sideways. These outlets are arranged so that the escaping gas slips from the wall of the fuselage, and so that the gas jets do not blow against the side rudder of the airplane or against the stabilizer or the wings thereof. In their closed position, the flaps 56 have the outside thereof lying flush with the fuselage, that is to say, in a manner such as to offer a minimum of resistance to the air. The flaps 56 are pivotally mounted to a link 64, as at 62, said link being connected to the rod 66 of a piston 68 running in a cylinder 70. The two sides of the latter are supplied with the pressure fluid, such as oil, through conduits 72, 74. The flaps 56 may open either outwardly, according to the upper portion of Fig. 1, or inwardly according to the lower portion of said figure.

When the plane is braked, pressure oil is introduced through the conduit 32, so that the valve body 18 is caused to close the normal gas outlet 12. At the same time, pressure oil is introduced through the inlets 74 into the cylinders 70, whereby the flaps 56 are caused to open. The exhaust gases from the driving machinery are then compelled to escape through the outlet openings formed by the flaps, so that an output to brake the forward movement of the plane is obtained.

Obviously, the invention is not restricted to the embodiment disclosed, but may be varied in the widest sense within the scope of the appended claim.

What is claimed:

In an aircraft having a power plant including a gas turbine discharging gases to the ambient atmosphere, means providing an annular passage for flow of gas from said turbine to a primary outlet directed rearwardly of the aircraft, said means comprising an outer casing and an inner tubular structure concentric with and spaced from said outer casing, a hollow valve body slidably carried by said tubular structure, fluid pressure actuated means for moving said valve body between a first position coacting with said outer casing to close said primary outlet and a second position coacting with said outer casing to open said primary outlet into annular form, means for cooling said tubular structure and said valve body comprising passages for admitting air from the ambient atmosphere to the interior of said tubular structure and discharge openings in said valve body for egress of cooling air to the ambient atmosphere, a plurality of secondary outlets in said outer casing for placing said annular gas passage in communication with the atmosphere, valve means for controlling each of said secondary outlets, said valve means comprising valve members arranged to direct gases from said gas channel substantially forwardly of the aircraft when said secondary outlets are opened and fluid pressure actuated means for moving said valve members to open or close said secondary outlets.

TEODOR IMMANUEL LINDHAGEN.
GUSTAV KARL WILLIAM BOESTAD.

REFERENCES CITED

The following references are of record in the file of this patent:

UNITED STATES PATENTS

| Number | Name | Date |
|---|---|---|
| 340,237 | Nagel et al. | Apr. 20, 1886 |
| 1,611,353 | Lepinte | Dec. 21, 1926 |
| 1,669,495 | Sloan | May 15, 1928 |
| 2,280,835 | Lysholm | Apr. 28, 1942 |
| 2,383,385 | Heintz | Aug. 21, 1945 |
| 2,395,435 | Thompson et al. | Feb. 26, 1946 |
| 2,402,363 | Bradbury | June 18, 1946 |

FOREIGN PATENTS

| Number | Country | Date |
|---|---|---|
| 4,322 | Great Britain | Nov. 8, 1876 |

OTHER REFERENCES

"Spear Shaped Weather Rocket," by C. P. Lent, in Astronautics, March 1944, pages 11–13.